(12) United States Patent
Franklin et al.

(10) Patent No.: US 11,580,444 B2
(45) Date of Patent: Feb. 14, 2023

(54) DATA VISUALIZATION MACHINE LEARNING MODEL PERFORMANCE

(71) Applicant: Apple Inc., Cupertino, CA (US)

(72) Inventors: Aaron B. Franklin, Seattle, WA (US); Kanit Wongsuphasawat, Seattle, WA (US); Naga Rama Abhishek Pratapa, Seattle, WA (US); Srikrishna Sridhar, Seattle, WA (US); Zachary A. Nation, Seattle, WA (US)

(73) Assignee: Apple Inc., Cupertino, CA (US)

( * ) Notice: Subject to any disclaimer, the term of this patent is extended or adjusted under 35 U.S.C. 154(b) by 795 days.

(21) Appl. No.: 16/530,855

(22) Filed: Aug. 2, 2019

(65) Prior Publication Data

US 2020/0334570 A1 Oct. 22, 2020

Related U.S. Application Data

(60) Provisional application No. 62/834,911, filed on Apr. 16, 2019.

(51) Int. Cl.
*G06F 16/00* (2019.01)
*G06N 20/00* (2019.01)
*G06F 16/904* (2019.01)
*G06F 17/16* (2006.01)

(52) U.S. Cl.
CPC ........... *G06N 20/00* (2019.01); *G06F 16/904* (2019.01); *G06F 17/16* (2013.01)

(58) Field of Classification Search
CPC ........ G06N 20/00; G06F 16/904; G06F 17/16
See application file for complete search history.

(56) References Cited

U.S. PATENT DOCUMENTS

| | | |
|---|---|---|
| 5,551,029 A | 8/1996 | Jagadish et al. |
| 6,009,271 A | 12/1999 | Whatley |
| 6,256,651 B1 | 7/2001 | Tuli |
| 6,553,366 B1 | 4/2003 | Miller |
| 7,590,639 B1 | 9/2009 | Ivanova et al. |
| 7,877,370 B2 | 1/2011 | Piedmonte |
| 7,899,799 B2 | 3/2011 | Furuya |
| 8,335,889 B2 | 12/2012 | Ungureanu |
| 8,504,568 B2 | 8/2013 | Chandrasekhara |
| 8,595,262 B1 | 11/2013 | Hayden |
| 8,612,971 B1 | 12/2013 | Fitzgerald |
| 8,775,476 B2 | 7/2014 | Henderson |

(Continued)

*Primary Examiner* — Hung Q Pham

(74) *Attorney, Agent, or Firm* — BakerHostetler

(57) ABSTRACT

The subject technology receives information associated with a machine learning model. The subject technology determines a set of metrics based at least in part on the information associated with the machine learning model, where the set of metrics corresponds to respective indicators of performance of the machine learning model based on input data from a data set, the set of metrics further including a number of errors produced by the machine learning model when applied to the input data from the data set. Further, the subject technology displays a user interface based at least in part on the set of metrics, where the user interface includes a set of graphical elements, and the set of graphical elements further includes representations of the set of metrics, and representations of the input data from the data set utilized by the machine learning model.

20 Claims, 14 Drawing Sheets

(56) References Cited

U.S. PATENT DOCUMENTS

| | | |
|---|---|---|
| 8,875,145 B2 | 10/2014 | Atterbury et al. |
| 8,954,418 B2 | 2/2015 | Faerber |
| 9,092,468 B2 | 7/2015 | Nelke |
| 9,165,035 B2 | 10/2015 | McSherry et al. |
| 9,235,652 B1 | 1/2016 | Jeffery et al. |
| 9,411,864 B2 | 8/2016 | Glider |
| 9,430,505 B2 | 8/2016 | Padmanabhan |
| 9,563,486 B1 | 2/2017 | Narsude et al. |
| 9,569,282 B2 | 2/2017 | Duffy |
| 9,613,116 B2 | 4/2017 | Bryan |
| 9,792,325 B2 | 10/2017 | Bruno et al. |
| 10,262,078 B2 | 4/2019 | Gu et al. |
| 10,331,740 B2 | 6/2019 | Low et al. |
| 10,719,301 B1 * | 7/2020 | Dasgupta ............ G06F 11/3688 |
| 2002/0083049 A1 | 6/2002 | Forster |
| 2002/0143263 A1 | 10/2002 | Shusterman |
| 2002/0198984 A1 | 12/2002 | Goldstein et al. |
| 2004/0267747 A1 | 12/2004 | Choi et al. |
| 2005/0001837 A1 | 1/2005 | Shannon |
| 2005/0251347 A1 * | 11/2005 | Perona ................ G06V 20/693 382/128 |
| 2005/0283337 A1 | 12/2005 | Sayal |
| 2007/0008317 A1 | 1/2007 | Lundstrom |
| 2007/0038978 A1 | 2/2007 | Meijer et al. |
| 2007/0214111 A1 | 9/2007 | Jin et al. |
| 2009/0271362 A1 | 10/2009 | Moestl |
| 2009/0327196 A1 | 12/2009 | Studer |
| 2011/0255424 A1 | 10/2011 | Nelson |
| 2011/0314400 A1 | 12/2011 | Mital |
| 2012/0089562 A1 | 4/2012 | Deremigio |
| 2012/0150791 A1 | 6/2012 | Willson |
| 2012/0158623 A1 | 6/2012 | Bilenko et al. |
| 2012/0221528 A1 | 8/2012 | Renkes et al. |
| 2012/0239609 A1 | 9/2012 | Zhao et al. |
| 2012/0310916 A1 | 12/2012 | Abadi et al. |
| 2013/0166535 A1 | 6/2013 | Valentin |
| 2014/0280142 A1 | 9/2014 | Wasson et al. |
| 2014/0282180 A1 | 9/2014 | Orofino |
| 2014/0304251 A1 | 10/2014 | Bornea et al. |
| 2015/0095308 A1 | 4/2015 | Kornacker |
| 2015/0142724 A1 | 5/2015 | Nair |
| 2015/0142777 A1 | 5/2015 | Mindnich |
| 2015/0278397 A1 | 10/2015 | Hendrickson |
| 2016/0018962 A1 | 1/2016 | Low et al. |
| 2019/0303406 A1 | 10/2019 | Gu et al. |

* cited by examiner

*FIG. 5*

DATA VISUALIZATION MACHINE LEARNING MODEL PERFORMANCE

CROSS-REFERENCE TO RELATED APPLICATIONS

The present application claims the benefit of U.S. Provisional Patent Application Ser. No. 62/834,911, entitled "DATA VISUALIZATION FOR MACHINE LEARNING MODEL PERFORMANCE," filed Apr. 16, 2019, which is hereby incorporated herein by reference in its entirety and made part of the present U.S. Utility Patent Application for all purposes.

TECHNICAL FIELD

The present description generally relates to developing machine learning applications.

BACKGROUND

Software engineers and scientists have been using computer hardware for machine learning to make improvements across different industry applications including image classification, video analytics, speech recognition and natural language processing, etc.

BRIEF DESCRIPTION OF THE DRAWINGS

Certain features of the subject technology are set forth in the appended claims. However, for purpose of explanation, several embodiments of the subject technology are set forth in the following figures.

FIG. 5 illustrates another example UI of an application that provides visualizations of machine learning model performance in accordance with one or more implementations.

DETAILED DESCRIPTION

Figure 1:
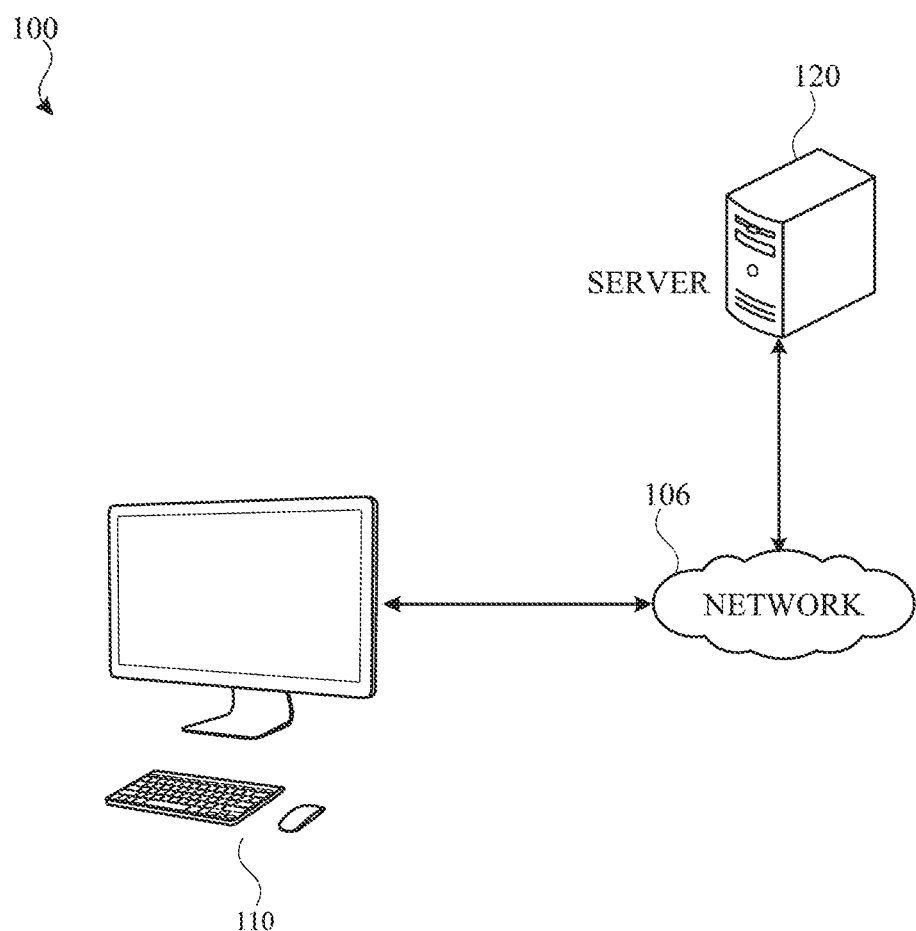
FIG. 1 illustrates an example network environment for a system providing user interfaces (UIs) for viewing performance metrics for machine learning models in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Machine learning has seen a significant rise in popularity in recent years due to the availability of massive amounts of training data, and advances in more powerful and efficient computing hardware. Machine learning may utilize models that are executed to provide predictions in particular applications (e.g., analyzing images and videos, fraud detection, etc.) among many other types of applications.

The subject technology provides techniques for providing graphical visualizations of information related to performance of a given machine learning model. Specifically, the subject technology provides user interfaces that present information indicating the performance of a classifier ML model. The user interfaces enable a user to visually inspect the performance of the classifier ML model by presenting various metrics associated with model and associated classification errors. Although the examples described herein relate to a classifier ML model, it is appreciated that the subject technology, in other implementations, can also provide user interfaces for viewing performance metrics of other types of machine learning models. Performance metrics as mentioned herein can refer to any type of metric that can be utilized as a measure of an aspect of a given machine learning model's performance with respect to a given training data set.

Implementations of the subject technology improve the computing functionality of a given electronic device by providing an efficient approach to viewing metrics associated with the performance of a given machine learning model. Prior approaches required developers to manually insert ad-hoc and/or custom code in order to view performance metrics. The subject technology therefore avoids this by advantageously providing user interfaces that can be utilized to view such performance metrics without necessitating the inclusions of such ad-hoc and/or custom code. These benefits therefore are understood as improving the computing functionality of a given electronic device, such as an end user device (which may generally have less computational and/or power resources available than, e.g., one or more cloud-based servers) by at least providing a specific combination of user experience elements thereby making it easier for a developer to evaluate the model with less ad-hoc code.

FIG. 1 illustrates an example network environment for a system providing user interfaces (UIs) for viewing performance metrics for machine learning models in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, and a server 120. The network 106 may communicatively (directly or indirectly) couple the electronic device 110 and/or the server 120. In one or more implementations, the network 106 may be an interconnected network of devices that may include, or may be communicatively coupled to, the Internet. For explanatory purposes, the network environment 100 is illustrated in FIG. 1 as including the electronic device 110, and the server 120; however, the network environment 100 may include any number of electronic devices and any number of servers.

The electronic device 110 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 110 is depicted as a desktop computer. The electronic device 110 may be, and/or may include all or part of, the electronic system discussed below with respect to FIG. 14.

In one or more implementations, the electronic device 110 may provide a system for training a machine learning model using training data, where the trained machine learning model is subsequently deployed to the electronic device 110. Further, the electronic device 110 may provide one or more machine learning frameworks for training machine learning models and/or developing applications using such machine learning models. In an example, such machine learning frameworks can provide various machine learning algorithms and models for different problem domains in machine learning. In an example, the electronic device 110 may include a deployed machine learning model that provides an output of data corresponding to a prediction or some other type of machine learning output.

The server 120 may provide a system for training a machine learning model using training data, where the trained machine learning model is subsequently deployed to the server 120. In an implementation, the server 120 may train a given machine learning model for deployment to a client electronic device (e.g., the electronic device 110). The machine learning model deployed on the server 120 can then perform one or more machine learning algorithms. In an implementation, the server 120 provides a cloud service that utilizes the trained machine learning model and continually learns over time.

Figure 2:
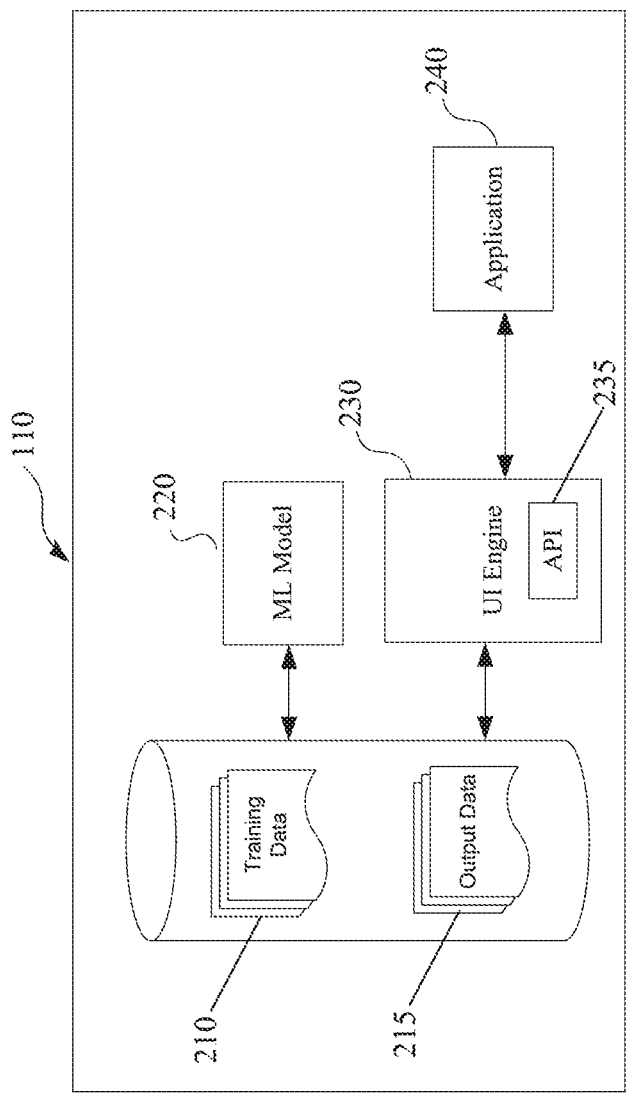
FIG. 2 illustrates an example computing architecture for a system providing user interfaces (UIs) for viewing performance metrics for machine learning models in accordance with one or more implementations.

FIG. 2 illustrates an example computing architecture for a system providing user interfaces (UIs) for viewing performance metrics for machine learning models in accordance with one or more implementations. For explanatory purposes, the computing architecture is described as being provided by the electronic device 110, such as by a processor and/or memory of the electronic device 110; however, the computing architecture may be implemented by any other electronic devices, such as the server 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the electronic device 110 includes training data 210 for training a machine learning model. In an example, the electronic device 110 may utilize one or more machine learning algorithms that uses training data 210 for training a machine learning (ML) model 220. In one or more implementations, the ML model 220 may be trained on another device, such as the server 120, and then deployed to the electronic device 110. The electronic device 110 further includes a user interface (UI) engine 230 which performs operations for providing user interfaces for viewing performance metrics of a given machine learning model (e.g., an image classifier model), which is discussed in more detail below. The UI engine 230 includes an API 235 which may be utilized by an application 240 to provide UIs for viewing one or more performance metrics based at least in part on the output data 215 of the ML model 220, which is discussed in further detail starting with FIG. 3.

Although the UI engine 230 is illustrated as being separate from the application 240, in an implementation, a UI engine with the same functionality as the UI engine 230 may be included as part of the application 240 thereby enabling the application 240 to perform similar or the same functions as a separate UI engine (e.g., the UI engine 230).

In an implementation, the application 240 can determine the performance metrics based at least in part on the output data 215 generated by the ML model 220. The application 240, for example, can automatically generate information for including in a confusion matrix based at least in part on the output data 215. In an implementation, the application 240 can determine performance metrics using the confusion matrix corresponding to summary of prediction results on a classification problem. In an example, the confusion matrix can include information corresponding to a number of correct predictions and a number of incorrect predictions with count values (e.g., a number of occurrences) for each class. The confusion matrix, in a binary classification example, includes a table with two dimensions ("actual" and "predicted"), and sets of "classes" in both dimensions, where actual classifications are columns and predicted classifications are rows. Additional rows and columns can be added to the confusion matrix for use in classification problems with three or more class values. The confusion matrix, in an example, can include information indicating true positives, true negatives, false positives, and false negatives generated by a classifier model, which can be utilized to determine one or more performance metrics including, but not limited to, accuracy, precision, recall, specificity, F1 score, and area under a receiver operating characteristic (ROC) curve, etc. Further, the confusion matrix can be determined based at least in part on a test data set that is utilized to evaluate the ML model 220.

In an implementation, the application 240, after generating performance metrics based on the confusion matrix, can store information related to the performance metrics as part of the output data 215 thereby forgoing re-calculating such performance metrics in the future and enabling the application 240 to simply retrieve the performance metrics for display at a subsequent time. In another implementation, the UI engine 230 may determine the performance metrics in a similar manner as the application 240 and provide the performance metrics to the application 240 thereby forgoing the application 240 from having to calculate the performance metrics (e.g., the application 240 provides the functionality of displaying the performance metrics calculated and provided by the UI engine 230).

In one or more implementations, the ML model 220 may be trained and deployed on the server 120. The server 120 may provide a web application that can be utilized by the electronic device 110 to access the UIs for viewing the performance metrics from the output data 215 of the ML model 220. In this example, the web application can determine the performance metrics based at least in part on the output data 215 of the ML model 220 and/or by using information from a confusion matrix in a similar manner as discussed above.

Figure 3:
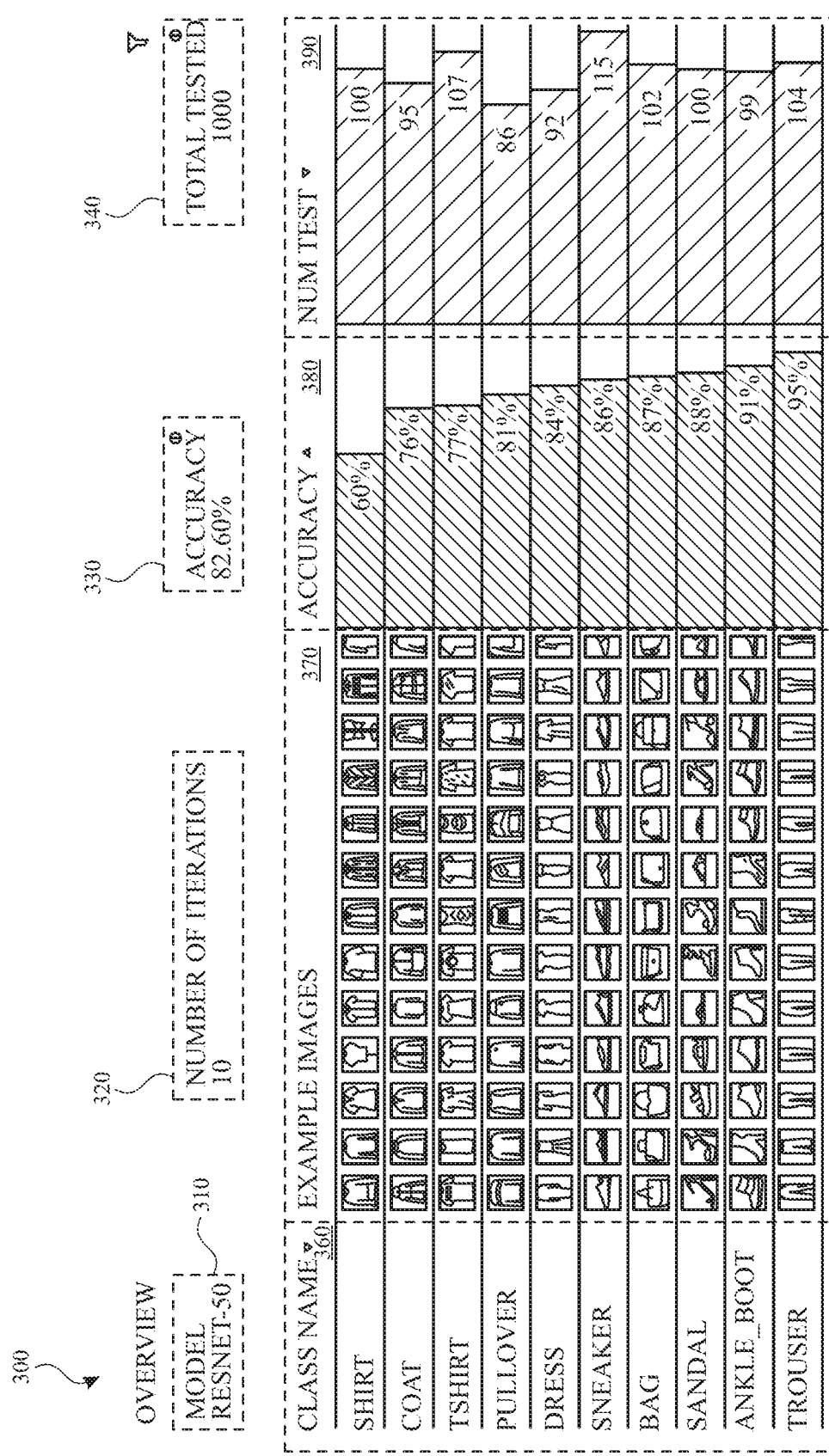
FIG. 3 illustrates an example UI of an application that provides visualizations of machine learning model performance in accordance with one or more implementations.

FIG. 3 illustrates an example UI 300 of an application that provides visualizations of machine learning model performance in accordance with one or more implementations. For explanatory purposes, the application (e.g., the application 240) is described as executing on the electronic device 110 of FIG. 1; however, the UI 300 of the application may be implemented by any other electronic device. For example, the UI 300 may be a web application that is hosted on the server 120 and accessed on the electronic device 110. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The UI 300 of FIG. 3 may be provided after a given machine learning model (e.g., the model 220) has undergone training using training data (e.g., the training data) and generates output data (e.g., the output data 215). The output data may then be provided to an UI engine (e.g., the UI engine 230) for providing a UI(s) with respective graphical elements that are displayed by a given application (e.g., the application 240).

The example of FIG. 3 relates to a user interface (UI) for visualizing aspects of the performance of an image classifier model. As illustrated, the UI 300 of the application includes different areas that provide information related to the performance of a given machine learning model. As shown, the UI 300 includes information indicating a model 310 (e.g., "Resnet-50"), a number of iterations 320, an accuracy metric 330, and a number of images 340 that were classified by the model 310. In the example of FIG. 3, the images shown in the UI 300 are included as part of a data set that the image classifier model receives as input for classifying into different classes of images. In an example, each class corresponds to a respective label that the image classifier model has attributed or tagged (e.g., as metadata) to a corresponding image from the data set. Such labels can be stored in the output data 215 and utilized in part by the UI engine 230 to extract and derive one or more performance metrics for display in the UI 300.

As shown, respective graphical areas and graphical elements therein are generally provided in a tabular format in the UI 300. In particular, the UI 300 of the application includes a graphical area 360 that includes a listing of different names of classes (e.g., labels generated by the image classifier model). As further shown, the UI 300 of the application includes the graphical area 370 for displaying images (e.g., thumbnail images) corresponding to each of the classes from the graphical area 360. In an example, a number of images provided for display in the graphical area 370 are limited based at least on the size of the graphical area 370. The UI 300 can provide a scrollable section that enables a user to scroll, in a horizontal direction, and view other images in a particular row in the graphical area 370.

The UI 300 also includes a graphical area 380 for displaying graphical representations of accuracy metrics corresponding to each of the classes from the graphical area 360. In an example, such accuracy metrics may be stored as part of the output data 215, as part of the application 240, and/or on the server 120. The application 240 can determine the accuracy metrics based at least in part on the output data 215 produced by the ML model 220. As mentioned above, the application 240 and/or the web application can determine performance metrics, including the accuracy metrics, using information from a confusion matrix derived at least in part on the output data 215 of the ML model 220.

In the example of FIG. 3, the accuracy metrics are sorted in ascending order from the least accurate metric (e.g., class "shirt") to the most accurate metric (e.g., class "trouser") shown in the graphical area 380 for the image classifier model. Further, the UI 300 provides a graphical area 390 showing respective numbers of images that were tested for each of the classes from the graphical area 360.

For providing information related to errors from the model 310, the UI 300 includes information indicating a number of errors 350 in classification from the model 310, which will be discussed in further detail below. The number of errors 350, in this example, corresponds to a total number of errors for the number of iterations 320 of training the model 310 using the input data from the data set.

Figure 4:
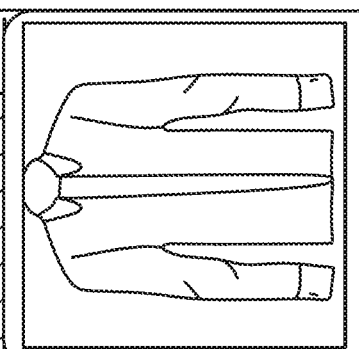
FIG. 4 illustrates another example UI of an application that provides visualizations of machine learning model performance in accordance with one or more implementations.

FIG. 4 illustrates another example UI of an application that provides visualizations of machine learning model performance in accordance with one or more implementations. FIG. 4 will be discussed with reference to portions of FIG. 3 described above. More specifically, the example of FIG. 4 includes portions of the UI 300 discussed above in FIG. 3 with additional graphical elements in response to user input selecting an image 410 provided in the graphical area 370.

As shown in FIG. 4, a row corresponding to the class "shirt" has been highlighted in the UI 300 in response to the user hovering over and/or selecting the image 410. As further shown, a second image 420 is provided in the user corresponding to the selected image 410 in the graphical area 370. The second image 420 is a larger version (e.g., greater resolution and/or zoomed-in) of the selected image 410 to enable the user to better visually inspect the selected image. The UI 300 indicates in the graphical area 380 a corresponding accuracy metric of "60%" for the class "shirt" that includes the selected image 410. As discussed above, performance metrics, including an accuracy metric, can be determined by the application 240 and/or the web application using information from a confusion matrix derived at least in part on the output data 215 of the ML model 220.

In this example, the classification of the images performed by the classification model is the least accurate for the images in the class "shirt" such that 40% of the images were erroneously classified by the image classifier model. To enable further investigation of these classification errors, the UI 300 provides for display further information corresponding to such errors as described further below.

In the following discussion, the user has selected to view errors (e.g., by selecting a row 405 corresponding to the class "shirt" or by selecting the class name corresponding to the class "shirt") for images that were misclassified and not included in the class "shirt". In FIG. 4, the UI 300 highlights the row 405 in response to the selection.

Figure 5:
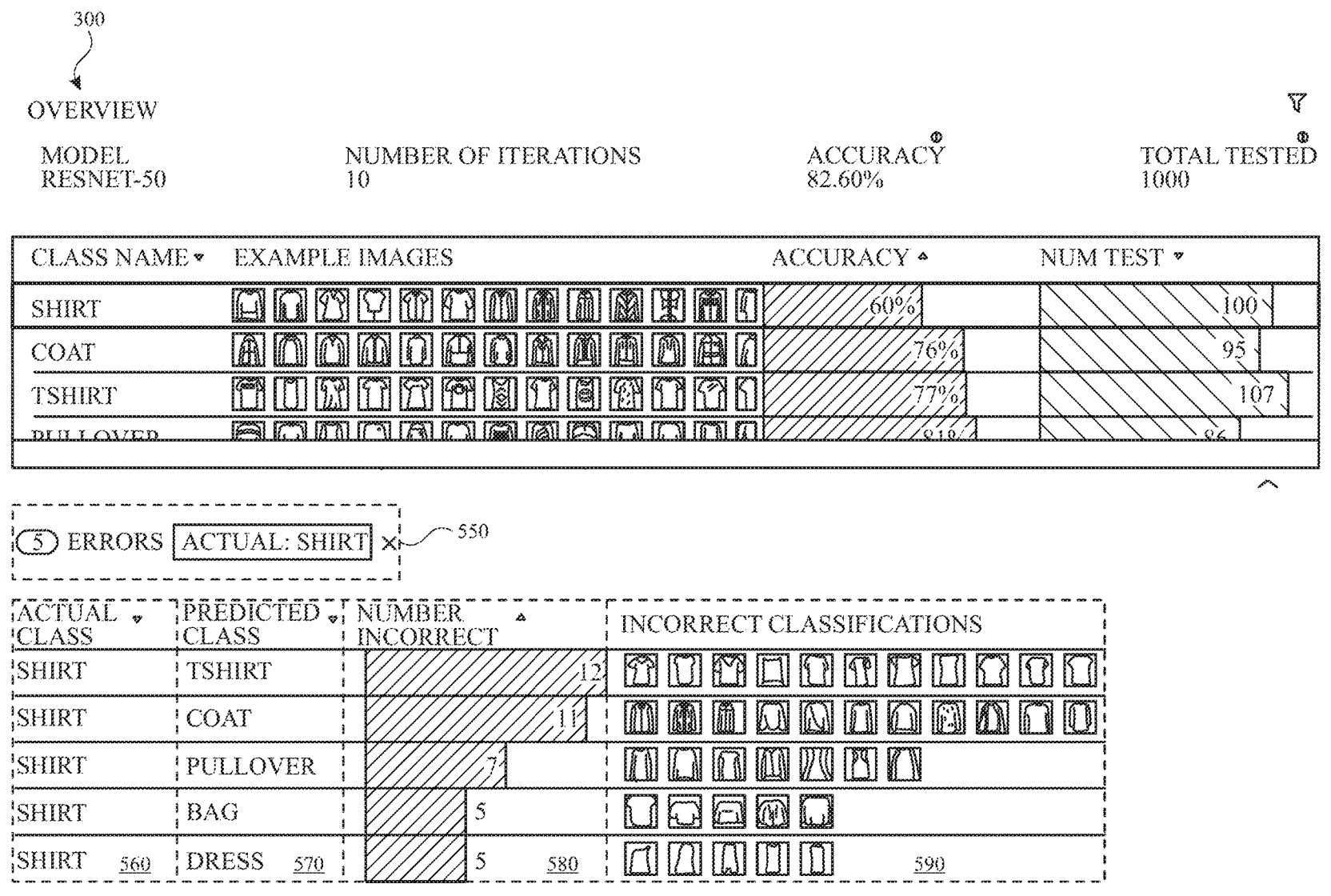

FIG. 5 illustrates another example UI 300 of an application that provides visualizations of machine learning model performance in accordance with one or more implementations. For example, the UI 300 may be a web application that is hosted on the server 120 and accessed on the electronic device 110. FIG. 5 will be discussed with reference to portions of FIG. 3 described above. More specifically, the example of FIG. 5 includes portions of the UI 300 discussed above in FIG. 3 with additional graphical elements showing information related to classification errors for images included in the class "shirt".

The UI 300 includes a graphical area 550 including information indicating a number of errors ("5") and a basis for the errors ("actual:shirt"). As discussed above, performance metrics, including information related to errors, can be determined by the application 240 and/or the web application using information from a confusion matrix derived at least in part on the output data 215 of the ML model 220. In the example of FIG. 5, the basis for the errors in the graphical area 550 corresponds to images that were erroneously classified by the image classifier model in a different class but instead should have been classified in the class "shirt".

The UI 300 further includes a graphical area 560 showing a listing of actual classes (e.g., the aforementioned basis for the errors). As mentioned above, the actual class for images corresponds to the class "shirt" which is shown in the graphical area 560. The UI 300 further includes a graphical area 570 that shows predicted classes for the images that were considered errors by the image classifier model.

The UI 300 further includes a graphical area 580 showing a number of errors as respective bars. The UI 300 further includes a graphical area 590 showing respective images corresponding to erroneously classified images.

In an implementation, a particular image from the graphical area 590 in the UI 300 can be selected and reclassified (e.g., by correcting its label) using the UI 300. This implementation can be utilized for correcting labels for mislabeled images in a given data set for the image classifier model. In an example, if a given data set for classification includes an image that is mislabeled (e.g., an image of a bag is mislabeled as a shirt, an image of a shirt is mislabeled as a coat, an image of a coat is mislabeled as a dress, etc.), the UI 300 enables correction of the label for that image thereby facilitating reclassification of the image during a subsequent training run of the model. For example, an image in a row corresponding to the class name "shirt" can be selected, which the user has identified as being mislabeled. Using the UI 300, the selected image can be relabeled to the correct label e.g., based on user input selecting or entering in a different label (e.g., class name). Upon being relabeled, the relabeled image can be stored in a new training data set. The model can then be retrained, e.g., automatically, based on the new training data set with the updated label.

In the following discussion, the user has selected a particular image of an erroneously classified image in the graphical area 590 of the UI 300.

Figure 6:
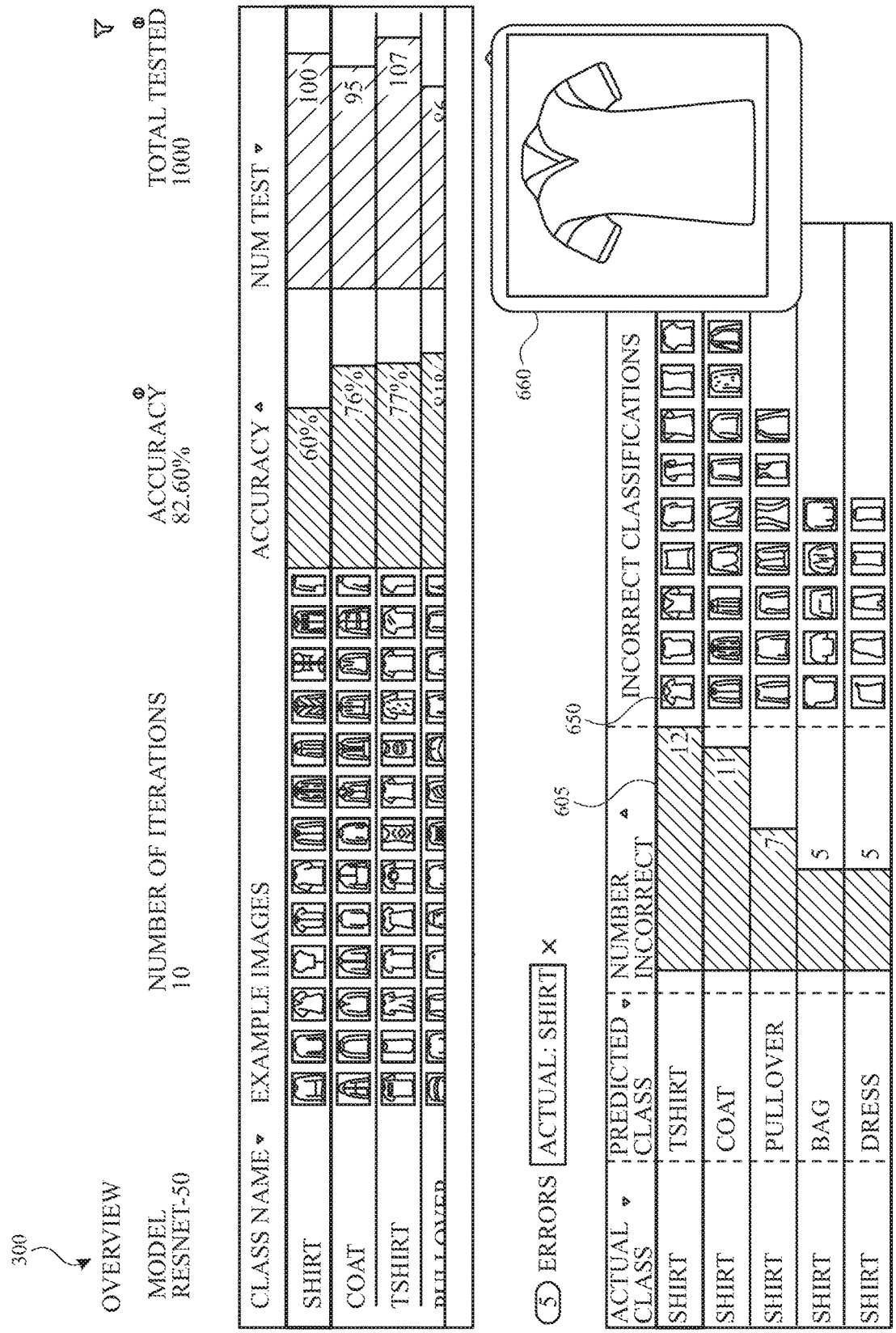
FIG. 6 illustrates another example UI of an application that provides visualizations of machine learning model performance in accordance with one or more implementations.

FIG. 6 illustrates another example UI 300 of an application that provides visualizations of machine learning model performance in accordance with one or more implementations. For example, the UI 300 may be a web application that is hosted on the server 120 and accessed on the electronic device 110. FIG. 6 will be discussed with reference to portions of FIG. 5 described above. More specifically, the example of FIG. 6 includes portions the UI 300 discussed above in FIG. 5 with an image for a selected from the graphical area 590.

As shown in FIG. 6, the UI 300 has received a selection of an image 650. In response to the selection, the UI 300 displays a second image 660 corresponding to the selected image 650. In FIG. 6, the UI 300 also highlights a row 605 in response to the selection.

The second image 660, as shown, is larger in size and included in a different portion of the UI 300 from the selected image 650. In this manner, the UI 300 enables the user to visually inspect the image 650 with a larger image (e.g., the second image 660).

In the following discussion, the user has selected a different predicted class in the graphical area 570 of the UI 300.

Figure 7:
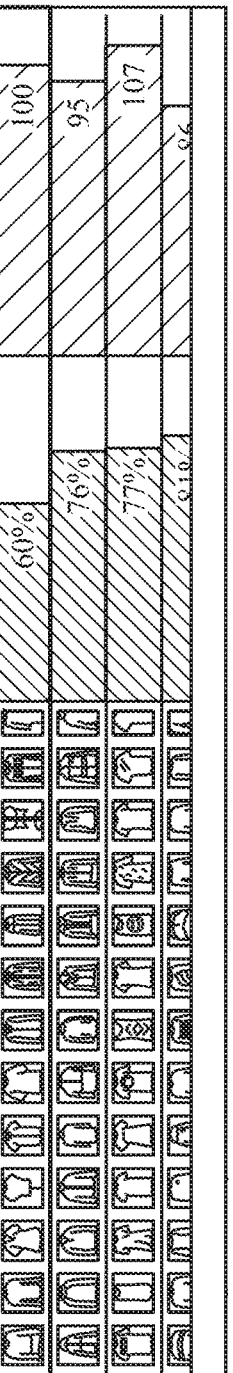
FIG. 7 illustrates another example UI of an application that provides visualizations of machine learning model performance in accordance with one or more implementations.

FIG. 7 illustrates another example UI 300 of an application that provides visualizations of machine learning model performance in accordance with one or more implementations. For example, the UI 300 may be a web application that is hosted on the server 120 and accessed on the electronic device 110. FIG. 7 will be discussed with reference to portions of FIG. 5 described above. More specifically, the example of FIG. 7 includes the same UI 300 discussed above in FIG. 5 with a particular predicted class selected from the graphical area 570.

As shown in FIG. 7, the UI 300 receives a selection of a predicted class 750 corresponding to a predicted class "bag". In FIG. 7, the UI 300 highlights a row 705 in response to the selection. As further shown in the UI 300, the predicted class "bag" includes five incorrect predictions with an associated set of images 760 shown in the same row 705 of the UI 300.

In the following discussion, the user has selected the row 705 of the UI 300 to view different images that were erroneously classified as the predicted class "bag".

Figure 8:
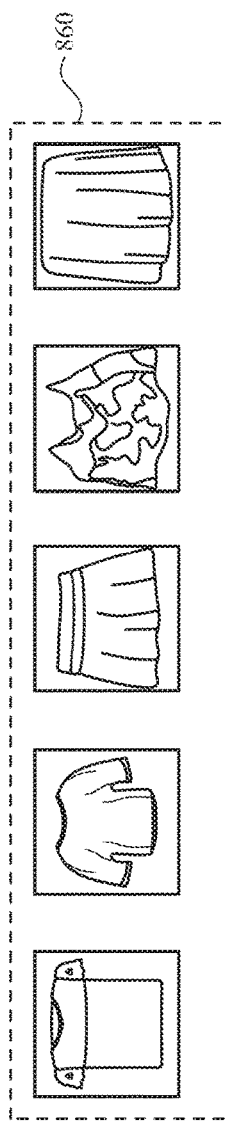
FIG. 8 illustrates another example of the UI described herein in accordance with one or more implementations.

FIG. 8 illustrates another example of the UI 300 described above in accordance with one or more implementations. For example, the UI 300 may be a web application that is hosted on the server 120 and accessed on the electronic device 110. FIG. 8 will be discussed with reference to portions of FIG. 7 described above. More specifically, the example of FIG. 8 includes portions of the UI 300 discussed above in FIG. 5 and FIG. 7 and includes an additional graphical area 860 with respective images corresponding to the set of images 760.

As shown in FIG. 8, the UI 300, in response to a selection of the row 705 of the UI 300 in FIG. 7, provides the graphical area 860. In the graphical area 860, a set of images are shown that correspond to the set of images 760 in FIG. 7. A graphical area 850 includes information indicating that the set of images in the graphical area 860 correspond to errors for the predicted class "bag".

In the following discussion, the user has selected a different image in a different row of the UI 300.

Figure 9:
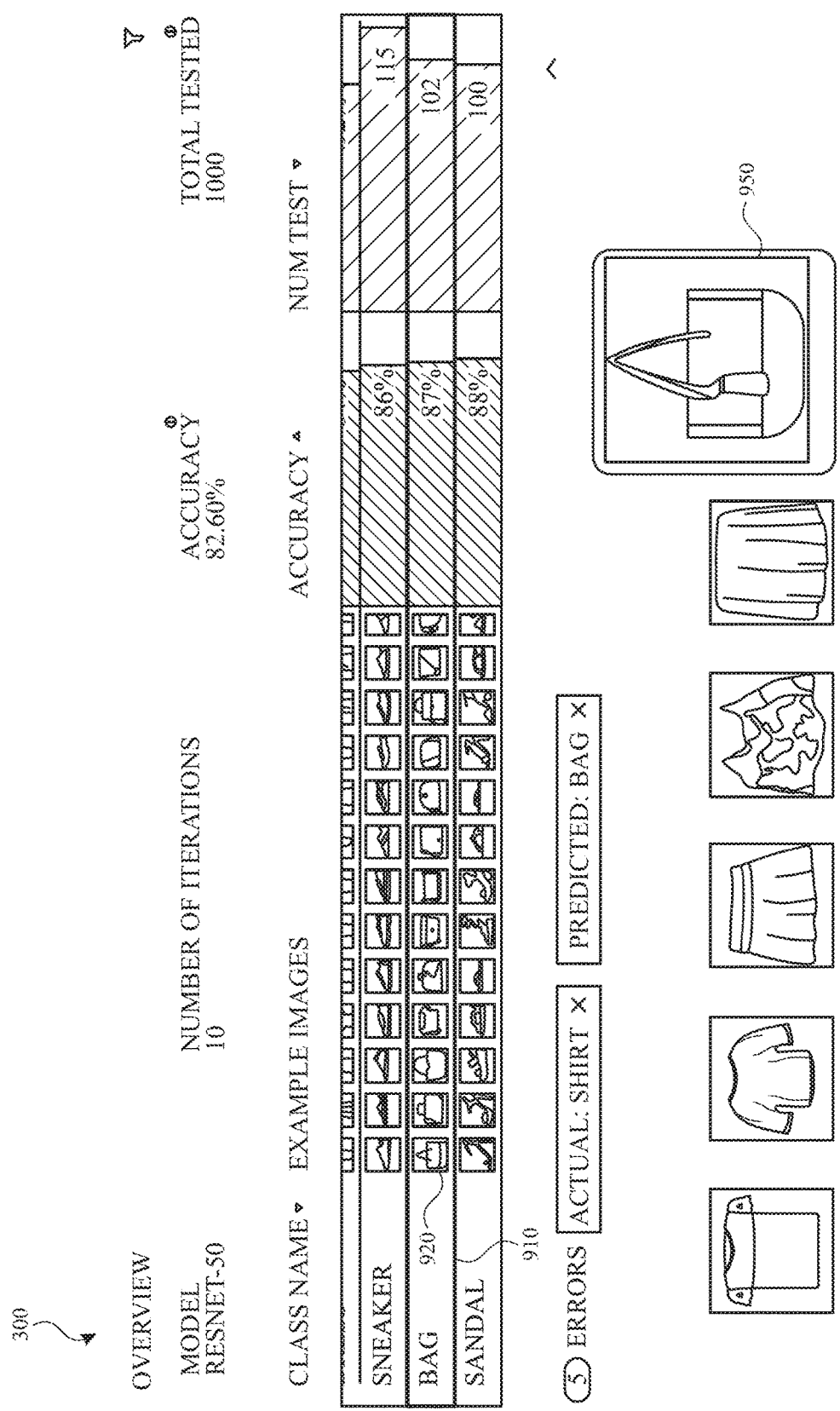
FIG. 9 illustrates another example UI of an application that provides visualizations of machine learning model performance in accordance with one or more implementations.

FIG. 9 illustrates another example UI 300 of an application that provides visualizations of machine learning model performance in accordance with one or more implementations. For example, the UI 300 may be a web application that is hosted on the server 120 and accessed on the electronic device 110. FIG. 9 will be discussed with reference to portions of FIG. 8 described above. More specifically, the example of FIG. 9 includes portions of the UI 300 discussed above in FIG. 8 and includes an additional image corresponding to a selected image.

As shown in FIG. 9, the UI 300, in response to a selection of an image 920 in a row 910, provides a second image 950 corresponding to the selected image 920. In an example, any other image from the same row 910 can be selected, and the UI 300 can provide a larger version (e.g., greater resolution and/or zoomed-in) of the selected image in this manner.

In the following discussion, the user has selected a particular graphical element of the UI 300 to show a set of options for displaying additional metrics for the image classifier model.

Figure 10:
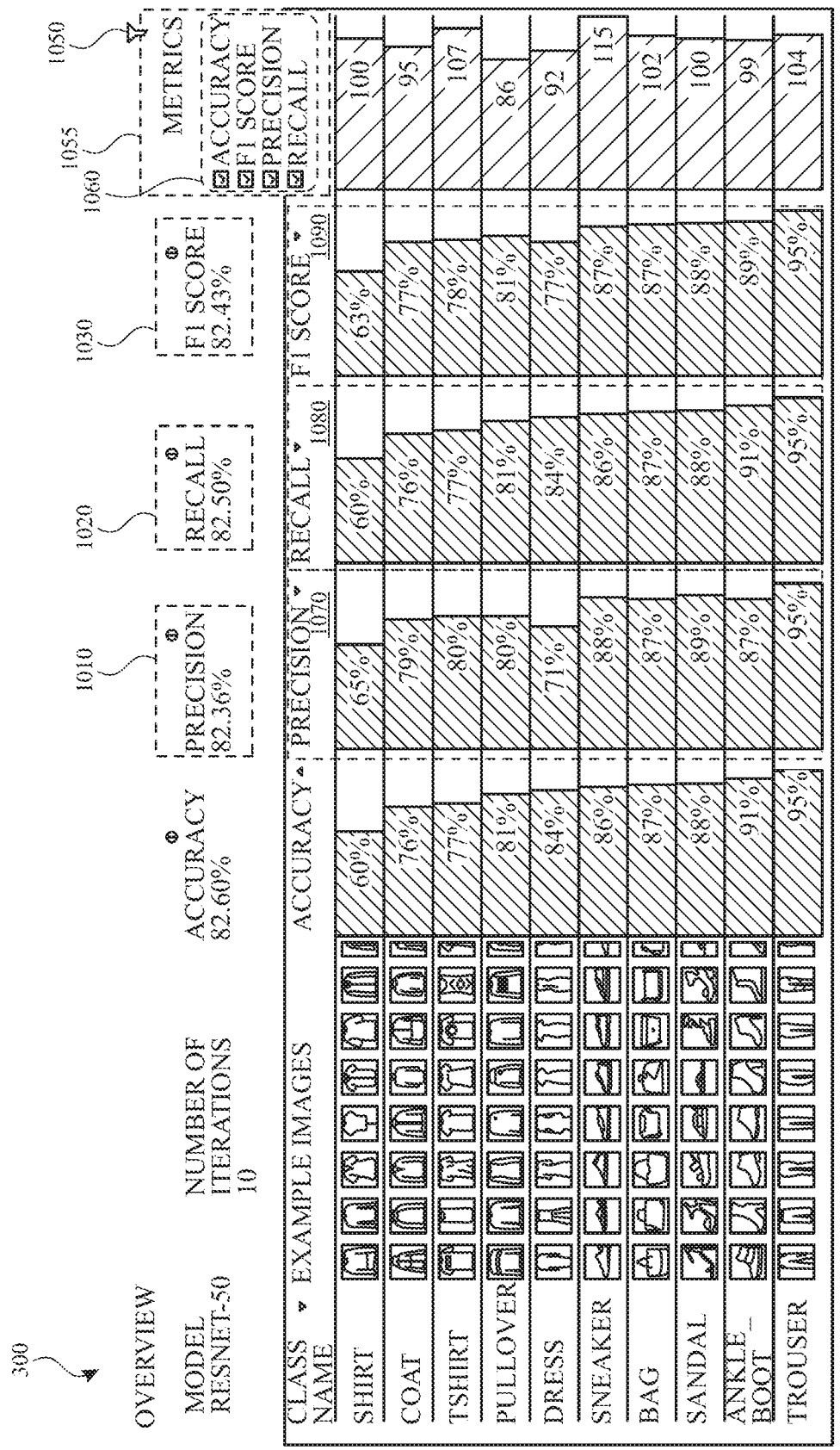
FIG. 10 illustrates another example UI of an application that provides visualizations of machine learning model performance in accordance with one or more implementations.

FIG. 10 illustrates another example UI 300 of an application that provides visualizations of machine learning model performance in accordance with one or more implementations. For example, the UI 300 may be a web application that is hosted on the server 120 and accessed on the electronic device 110. More specifically, the example of FIG. 10 includes additional graphical elements showing additional metrics, for the image classifier model, that have been selected for display in the UI 300. As discussed above, performance metrics, including information related to the additional metrics shown in FIG. 10, can be determined by the application 240 and/or the web application using information from a confusion matrix derived at least in part on the output data 215 of the ML model 220.

As shown in FIG. 10, the UI 300, in response to a selection of a graphical element 1050 (e.g., an icon, etc.), provides a graphical area 1055 with a set of options 1060 (e.g., different graphical elements) including respective metrics of the image classifier model. In an example, the graphical element 1050 corresponds to a command or operation that, upon selection, results in the display of the graphical area 1055 with the set of options 1060 in the UI 300. As further shown in this example, graphical elements (e.g., checkboxes) corresponding to respective metrics for "Accuracy", "F1 Score", "Precision", and "Recall" have been selected within the set of options 1060. As discussed above, performance metrics, including information related to the additional metrics shown in FIG. 10, can be determined by the application 240 and/or the web application using information from a confusion matrix derived at least in part on the output data 215 of the ML model 220.

In response to the selection of the set of options 1060, the UI 300 displays a graphical area 1070 for metrics corresponding to precision of respective classes (e.g., an indicator of how accurate the model is for predictions of actual positives among all predictions of positives), a graphical area 1080 for metrics corresponding to recall of respective classes (e.g., an indicator of how many of the actual positives were classified by the model as a true positive among all predictions classified as true positives and false negatives), and a graphical area 1090 for metrics corresponding to F1 score of respective classes (e.g., a function of precision and recall indicating a balance between precision and recall). As further shown, the UI 300 includes information of precision 1010, recall 1020, and F1 score 1030 for the image classifier model.

In the following discussion, the user has selected a particular graphical element of the UI 300 to sort metrics for the image classifier model.

Figure 11:
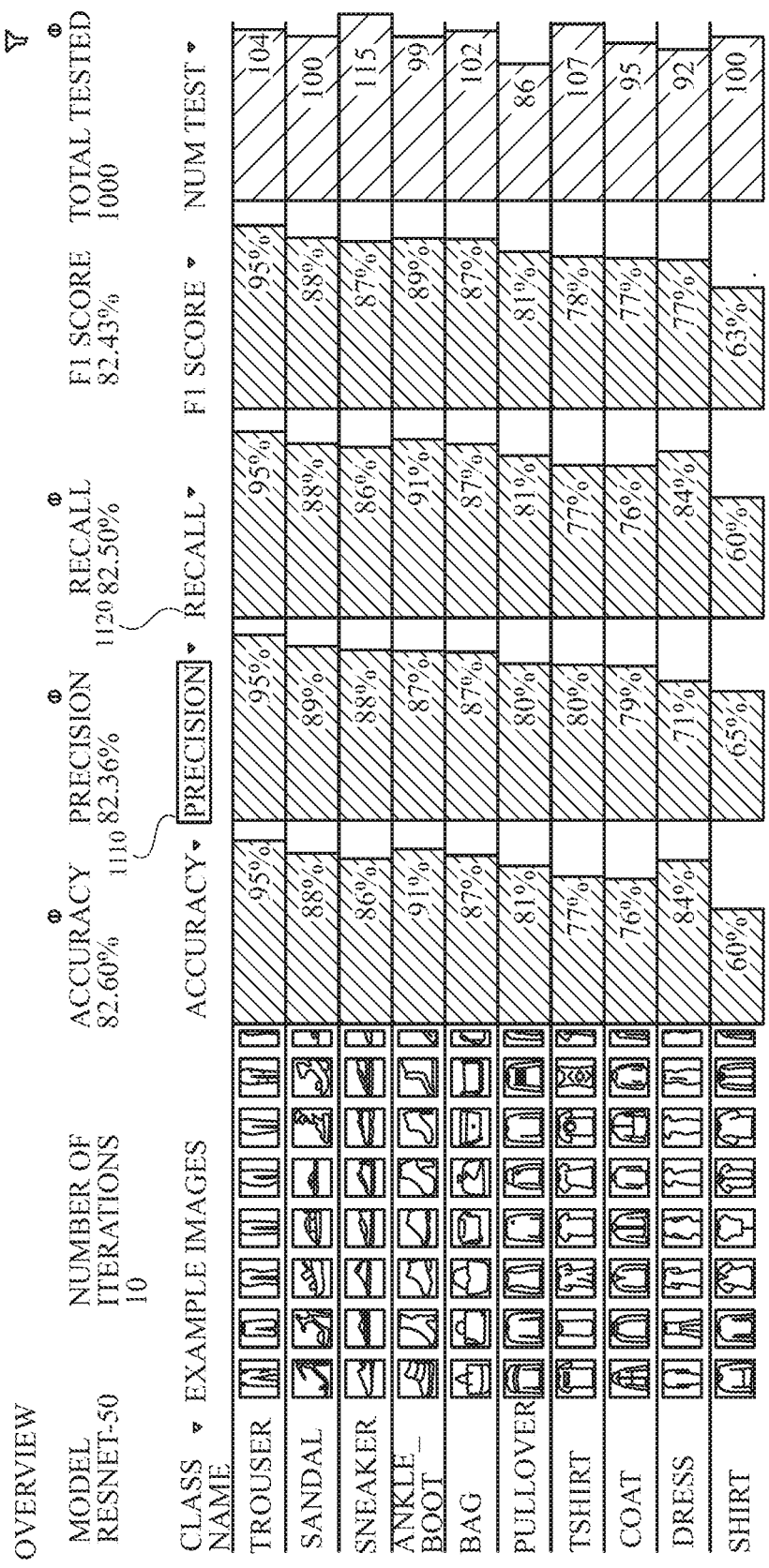
FIG. 11 illustrates another example UI of an application that provides visualizations of machine learning model performance in accordance with one or more implementations.

FIG. 11 illustrates another example UI 300 of an application that provides visualizations of machine learning model performance in accordance with one or more implementations. For example, the UI 300 may be a web application that is hosted on the server 120 and accessed on the electronic device 110. FIG. 11 will be discussed with reference to portions of FIG. 10 described above. More specifically, the example of FIG. 11 includes graphical elements showing metrics, for the image classifier model, that have been sorted in response to a selection of particular graphical element.

As shown in FIG. 11, the UI 300, in response to a selection of a graphical element 1110 corresponding to the precision metrics, displays metrics of the image classifier model in a descending order in accordance with respective values of the precision metrics. It is appreciated that other graphical elements in the UI 300 may also be selected corresponding to any other metric in order to sort the metrics in accordance to that selection. For example, a graphical element 1120 corresponding to the recall metric may be selected, and the UI 300 would then sort the metrics for display in accordance with the values of the recall metrics.

In the following discussion, the user has selected a particular graphical element of the UI 300 to show further information corresponding to a particular metric of the image classifier model.

Figure 12:
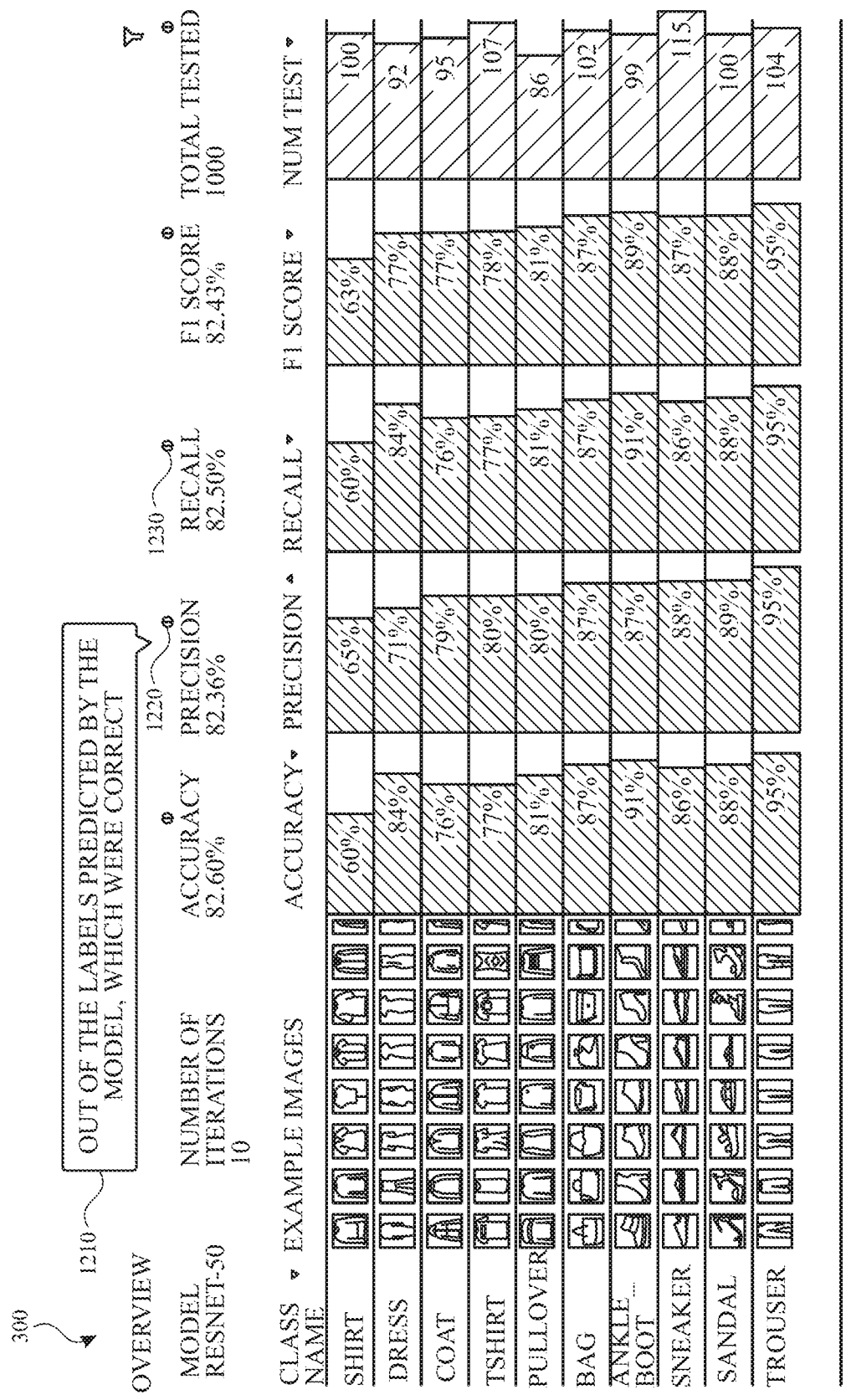
FIG. 12 illustrates another example UI of an application that provides visualizations of machine learning model performance in accordance with one or more implementations.

FIG. 12 illustrates another example UI 300 of an application that provides visualizations of machine learning model performance in accordance with one or more implementations. For example, the UI 300 may be a web application that is hosted on the server 120 and accessed on the electronic device 110. FIG. 12 will be discussed with reference to portions of FIG. 10 described above. More specifically, the example of FIG. 12 includes graphical elements showing metrics, for the image classifier model, that have been sorted in response to a selection of particular graphical element.

As shown in FIG. 12, the UI 300, in response to a selection of a graphical element 1220 corresponding to the precision metric, displays information 1210 explaining the precision metric to the user. It is appreciated that other graphical elements in the UI 300 may also be selected corresponding to any other metric in order to display information explaining the selected metric to the user. For example, a graphical element 1230 corresponding to the recall metric may be selected, and the UI 300 would then provide information for display to explain the recall metric to the user.

Figure 13:
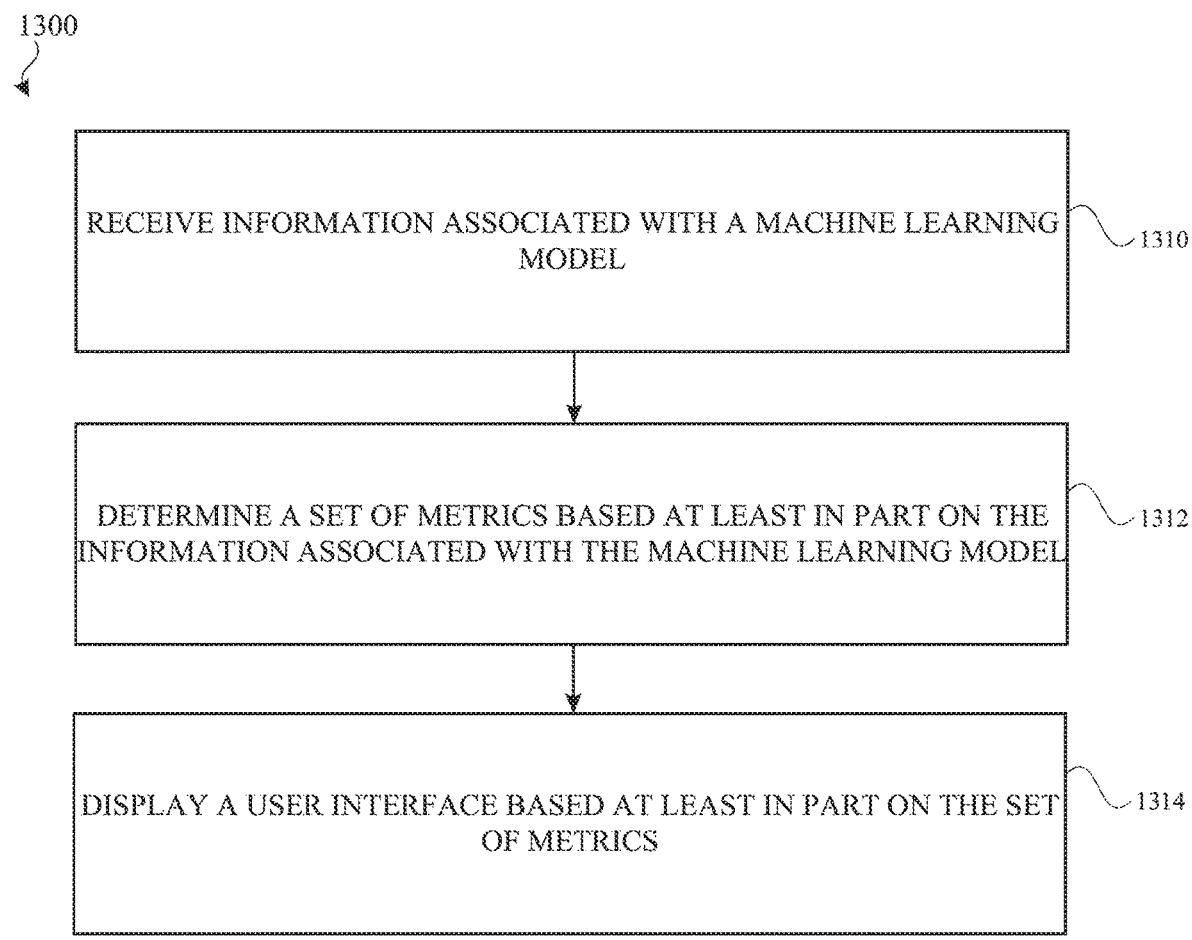
FIG. 13 illustrates a flow diagram of an example process for providing a user interface for displaying performance metrics of a machine learning model in accordance with one or more implementations.

FIG. 13 illustrates a flow diagram of an example process for providing a user interface for displaying performance metrics of a machine learning model in accordance with one or more implementations. For explanatory purposes, the process 1300 is primarily described herein with reference to components of the computing architecture of FIG. 2, which may be executed by one or more processors of the electronic device 110 of FIG. 1. However, the process 1300 is not limited to the electronic device 110, and one or more blocks (or operations) of the process 1300 may be performed by one or more other components of other suitable devices, such as by the server 120. Further for explanatory purposes, the blocks of the process 1300 are described herein as occurring in serial, or linearly. However, multiple blocks of the process 1300 may occur in parallel. In addition, the blocks of the process 1300 need not be performed in the order shown and/or one or more blocks of the process 1300 need not be performed and/or can be replaced by other operations.

The application 240 receives information associated with a machine learning model, wherein the information comprises output data of the machine learning model, and the machine learning model is applied on input data from a data set to generate the output data (1310).

The application 240 determines a set of metrics based at least in part on the information associated with the machine learning model, wherein the set of metrics corresponds to respective indicators of performance of the machine learning model based on the input data from the data set, and the set of metrics further includes a number of errors produced by the machine learning model when applied to the input data from the data set (1312).

As mentioned above, the application 240, for example, can automatically generate information for including in a confusion matrix based at least in part on the output data 215. In an implementation, the application 240 can determine performance metrics using the confusion matrix corresponding to summary of prediction results on a classification problem. The confusion matrix, in an example, can include information indicating true positives, true negatives, false positives, and false negatives generated by a classifier model, which can be utilized to determine one or more performance metrics including, but not limited to, accuracy, precision, recall, specificity, F1 score, and area under a receiver operating characteristic (ROC) curve, etc. Further, the confusion matrix can be determined based at least in part on a test data set that is utilized to evaluate the ML model 220.

The application 240 displays a user interface based at least in part on the set of metrics, wherein the user interface comprises a set of graphical elements, the set of graphical elements including representations of the set of metrics, representations of the input data from the data set utilized by the machine learning model, and an indication of the number of errors produced by the machine learning model when applied to the input data from the data (1314).

Figure 14:
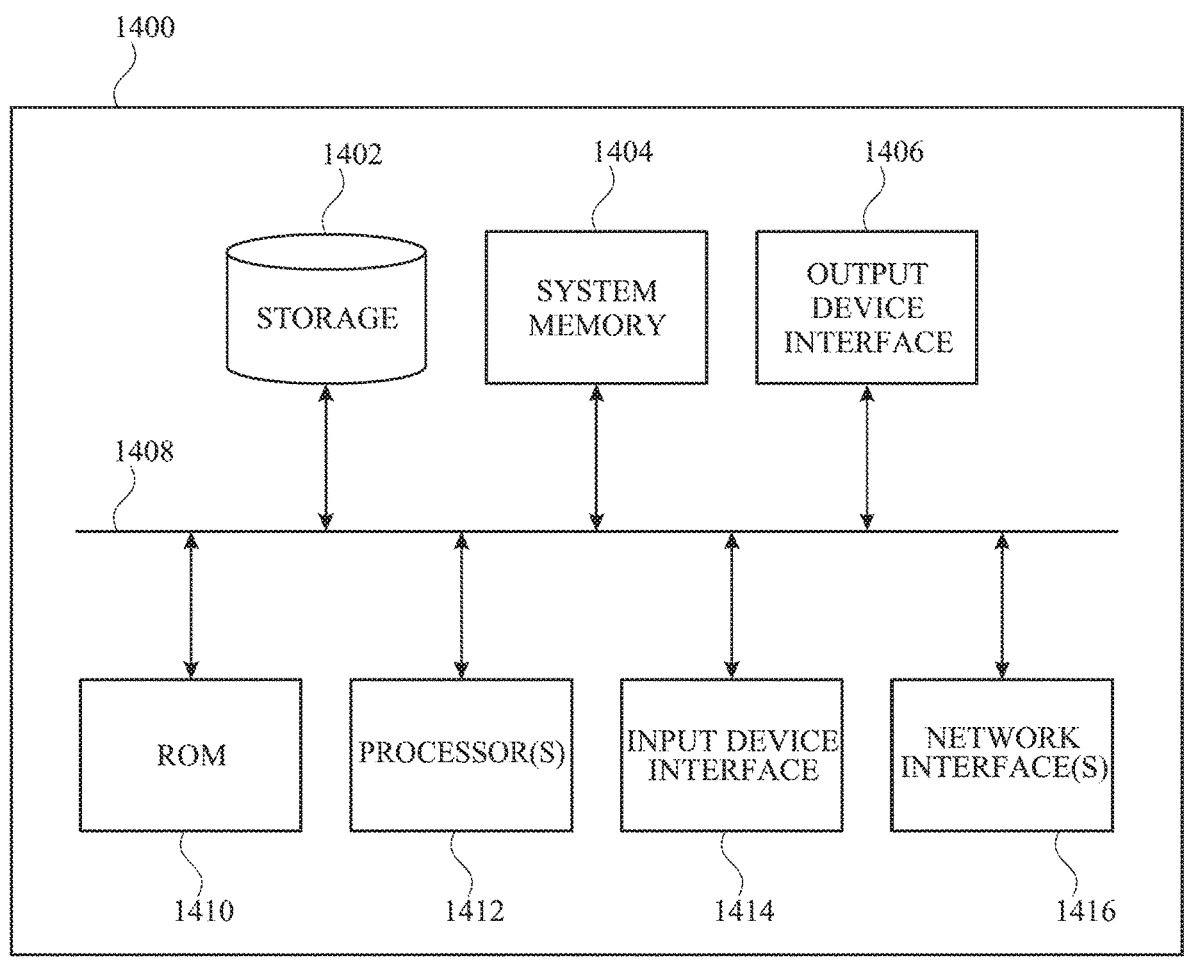
FIG. 14 illustrates an electronic system with which one or more implementations of the subject technology may be implemented.

FIG. 14 illustrates an electronic system 1400 with which one or more implementations of the subject technology may be implemented. The electronic system 1400 can be, and/or can be a part of, the electronic device 110, and/or the server 120 shown in FIG. 1. The electronic system 1400 may include various types of computer readable media and interfaces for various other types of computer readable media. The electronic system 1400 includes a bus 1408, one or more processing unit(s) 1412, a system memory 1404 (and/or buffer), a ROM 1410, a permanent storage device 1402, an input device interface 1414, an output device interface 1406, and one or more network interfaces 1416, or subsets and variations thereof.

The bus 1408 collectively represents all system, peripheral, and chipset buses that communicatively connect the numerous internal devices of the electronic system 1400. In one or more implementations, the bus 1408 communicatively connects the one or more processing unit(s) 1412 with the ROM 1410, the system memory 1404, and the permanent storage device 1402. From these various memory units, the one or more processing unit(s) 1412 retrieves instructions to execute and data to process in order to execute the processes of the subject disclosure. The one or more processing unit(s) 1412 can be a single processor or a multi-core processor in different implementations.

The ROM 1410 stores static data and instructions that are needed by the one or more processing unit(s) 1412 and other modules of the electronic system 1400. The permanent storage device 1402, on the other hand, may be a read-and-write memory device. The permanent storage device 1402 may be a non-volatile memory unit that stores instructions and data even when the electronic system 1400 is off. In one or more implementations, a mass-storage device (such as a magnetic or optical disk and its corresponding disk drive) may be used as the permanent storage device 1402.

In one or more implementations, a removable storage device (such as a floppy disk, flash drive, and its corresponding disk drive) may be used as the permanent storage device 1402. Like the permanent storage device 1402, the system memory 1404 may be a read-and-write memory device. However, unlike the permanent storage device 1402, the system memory 1404 may be a volatile read-and-write memory, such as random access memory. The system memory 1404 may store any of the instructions and data that one or more processing unit(s) 1412 may need at runtime. In one or more implementations, the processes of the subject disclosure are stored in the system memory 1404, the permanent storage device 1402, and/or the ROM 1410. From these various memory units, the one or more processing unit(s) 1412 retrieves instructions to execute and data to process in order to execute the processes of one or more implementations.

The bus 1408 also connects to the input and output device interfaces 1414 and 1406. The input device interface 1414 enables a user to communicate information and select commands to the electronic system 1400. Input devices that may be used with the input device interface 1414 may include, for example, alphanumeric keyboards and pointing devices (also called "cursor control devices"). The output device interface 1406 may enable, for example, the display of images generated by electronic system 1400. Output devices that may be used with the output device interface 1406 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 14, the bus 1408 also couples the electronic system 1400 to one or more networks and/or to one or more network nodes, such as the electronic device 110 shown in FIG. 1, through the one or more network interface(s) 1416. In this manner, the electronic system 1400 can be a part of a network of computers (such as a LAN, a wide area network ("WAN"), or an Intranet, or a network of networks, such as the Internet. Any or all components of the electronic system 1400 can be used in conjunction with the subject disclosure.

One aspect of the present technology may include the gathering and use of data available from specific and legitimate sources for performing machine learning operations such as those provided in applications that utilize machine learning models (e.g., neural networks) to provide particular functionality that may be useful for users. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to perform machine learning tasks (e.g., predictions, classifications, determining similarity, detecting anomalies, etc.) that are useful to users. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
receiving information associated with a machine learning model, wherein the information comprises output data of the machine learning model, and the machine learning model is applied on input data from a data set to generate the output data;
determining a set of metrics based at least in part on the information associated with the machine learning model, wherein the set of metrics corresponds to respective indicators of performance of the machine learning model based on the input data from the data set, the set of metrics further including a number of errors produced by the machine learning model when applied to the input data from the data set;
displaying a user interface based at least in part on the set of metrics, wherein the user interface comprises a set of graphical elements, and the set of graphical elements further includes representations of the set of metrics, and representations of the input data from the data set utilized by the machine learning model;
displaying a first graphical element indicating a number of incorrect classifications and a set of images associated with the number of incorrect classifications in response to a selection of a particular graphical element of the representations of the input data;
receiving a particular selection of a particular image from the set of images;
receiving input corresponding to a different label for the particular image;
storing information related to the different label for the particular image into an updated training data set; and
retraining the machine learning model using at least the updated training data set.

2. The method of claim 1, further comprising:
receiving a selection of the particular graphical element of the user interface, the particular graphical element corresponding to a name of a class classified by the machine learning model; and
displaying, in response to the selection of the particular graphical element, a second set of graphical elements, the second set of graphical elements including a second graphical element indicating an actual class of a particular input data, a third graphical element indicating a predicted class of the particular input data, the first graphical element indicating the number of incorrect classifications, and a fourth graphical element indicating the set of images associated with the number of incorrect classifications.

3. The method of claim 2, further comprising:
receiving a second selection of the third graphical element indicating the predicted class; and
displaying, in response to the second selection of the third graphical element, a second set of images, the second set of images comprising a different version of the set of images associated with the number of incorrect classifications.

4. The method of claim 3, wherein the different version of the set of images comprises images with a greater resolution than corresponding resolutions of the set of images.

5. The method of claim 2, further comprising:
receiving a particular selection of a particular image from the set of images associated with the number of incorrect classifications; and
displaying, in response to the particular selection, a different version of the particular image.

6. The method of claim 1, further comprising:
receiving a selection of a particular graphical element of the user interface, the particular graphical element corresponding for an option for displaying additional metrics from the set of metrics; and
displaying, in response to the selection of the particular graphical element, a second set of graphical elements, the second set of graphical elements including additional metrics associated with the machine learning model that are not currently displayed in the user interface.

7. The method of claim 6, further comprising:
receiving another selection of another particular graphical element from the second set of graphical elements, the other particular graphical element corresponding to an additional metric of the machine learning model; and
displaying, in response to the other selection of the other particular graphical element, a representation of the additional metric of the machine learning model in the user interface.

8. The method of claim 1, wherein the set of graphical elements are provided for display in a tabular format.

9. The method of claim 1, wherein the set of metrics is based at least in part on a confusion matrix.

10. A system comprising:
a processor;
a memory device containing instructions, which when executed by the processor cause the processor to:
receive information associated with a machine learning model, wherein the information comprises output data of the machine learning model, and the machine learning model is applied on input data from a data set to generate the output data;
determine a set of metrics based at least in part on the information associated with the machine learning model, wherein the set of metrics corresponds to respective indicators of performance of the machine learning model based on the input data from the data set, the set of metrics further including a number of errors produced by the machine learning model when applied to the input data from the data set;
display a user interface based at least in part on the set of metrics, wherein the user interface comprises a set of graphical elements, and the set of graphical elements further includes representations of the set of metrics, and representations of the input data from the data set utilized by the machine learning model;
display a first graphical element indicating a number of incorrect classifications and a set of images associated with the number of incorrect classifications in response to a selection of a particular graphical element of the representations of the input data;
receive a particular selection of a particular image from the set of images;
receive input corresponding to a different label for the particular image;
store information related to the different label for the particular image into an updated training data set; and
retrain the machine learning model using at least the updated training data set.

11. The system of claim 10, wherein the memory device contains further instructions, which when executed by the processor further cause the processor to:
receive a selection of a particular graphical element of the user interface, the particular graphical element corresponding to a name of a class classified by the machine learning model; and display, in response to the selection of the particular graphical element, a second set of graphical elements, the second set of graphical elements including a second graphical element indicating an actual class of a particular input data, a third graphical element indicating a predicted class of the particular input data, the first graphical element indicating the number of incorrect classifications, and a fourth graphical element indicating the set of images associated with the number of incorrect classifications.

12. The system of claim 11, wherein the memory device contains further instructions, which when executed by the processor further cause the processor to:
receive a second selection of the third graphical element indicating the predicted class; and
display, in response to the second selection of the third graphical element, a second set of images, the second set of images comprising a different version of the set of images associated with the number of incorrect classifications.

13. The system of claim 12, wherein the different version of the set of images comprises images with a greater resolution than corresponding resolutions of the set of images.

14. The system of claim 11, wherein the memory device contains further instructions, which when executed by the processor further cause the processor to:
receive a particular selection of a particular image from the set of images associated with the number of incorrect classifications; and
display, in response to the particular selection, a different version of the particular image.

15. The system of claim 10, wherein the memory device contains further instructions, which when executed by the processor further cause the processor to:
receive a selection of a particular graphical element of the user interface, the particular graphical element corresponding for an option for displaying additional metrics from the set of metrics; and
display, in response to the selection of the particular graphical element, a second set of graphical elements, the second set of graphical elements including additional metrics associated with the machine learning model that are not currently displayed in the user interface.

16. The system of claim 15, wherein the memory device contains further instructions, which when executed by the processor further cause the processor to:
receive another selection of another particular graphical element from the second set of graphical elements, the other particular graphical element corresponding to an additional metric of the machine learning model; and
display, in response to the other selection of the other particular graphical element, a representation of the additional metric of the machine learning model in the user interface.

17. The system of claim 10, wherein the machine learning model comprises an image classifier model and the input data comprises different images.

18. A non-transitory computer-readable medium comprising instructions, which when executed by a computing device, cause the computing device to perform operations comprising:
receiving information associated with a machine learning model, wherein the information comprises output data of the machine learning model, and the machine learning model is applied on input data from a data set to generate the output data;
determining a set of metrics based at least in part on the information associated with the machine learning model, wherein the set of metrics corresponds to respective indicators of performance of the machine learning model based on the input data from the data set, the set of metrics further including a number of errors produced by the machine learning model when applied to the input data from the data set;
displaying a user interface based at least in part on the set of metrics, wherein the user interface comprises a set of graphical elements, and the set of graphical elements further includes representations of the set of metrics, and representations of the input data from the data set utilized by the machine learning model;
displaying a graphical element indicating a number of incorrect classifications and a set of images associated with the number of incorrect classifications in response to a selection of a particular graphical element of the representations of the input data;
receiving a particular selection of a particular image from the set of images;
receiving input corresponding to a different label for the particular image;
storing information related to the different label for the particular image into an updated training data set; and
retraining the machine learning model using at least the updated training data set.

19. The non-transitory computer-readable medium of claim 18, wherein the set of graphical elements are provided for display in a tabular format.

20. The non-transitory computer-readable medium of claim 18, wherein the set of metrics is based at least in part on a confusion matrix.

* * * * *

UNITED STATES PATENT AND TRADEMARK OFFICE
CERTIFICATE OF CORRECTION

| | | |
|---|---|---|
| PATENT NO. | : 11,580,444 B2 | Page 1 of 1 |
| APPLICATION NO. | : 16/530855 | |
| DATED | : February 14, 2023 | |
| INVENTOR(S) | : Aaron B. Franklin et al. | |

It is certified that error appears in the above-identified patent and that said Letters Patent is hereby corrected as shown below:

On the Title Page

Item [54] and in the Specification Column 1, Line 1:
"Data Visualization Machine Learning Model Performance",
Should read:
--Data Visualization For Machine Learning Model Performance--.

Signed and Sealed this
Twenty-second Day of August, 2023

Katherine Kelly Vidal
*Director of the United States Patent and Trademark Office*